United States Patent Office 3,698,992
Patented Oct. 17, 1972

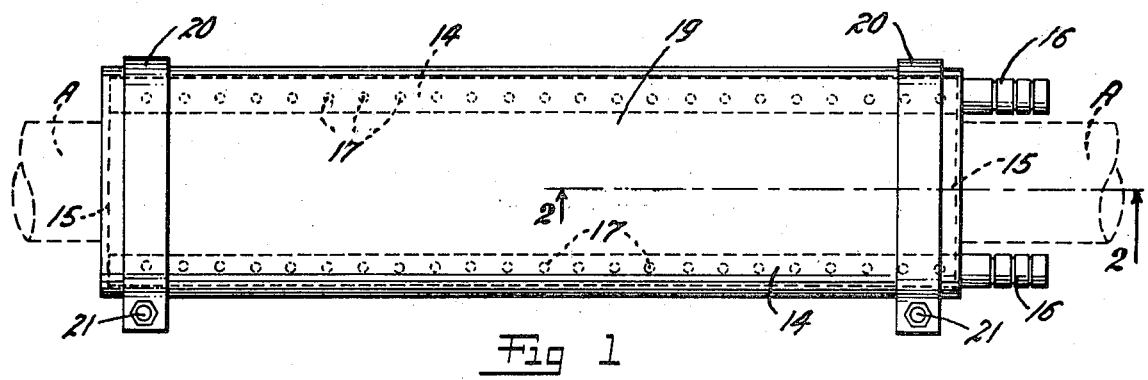
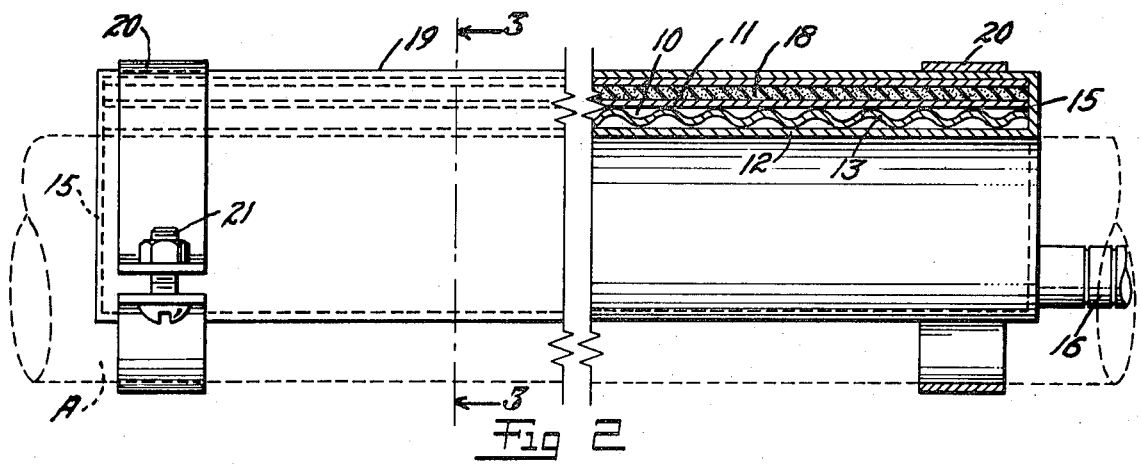
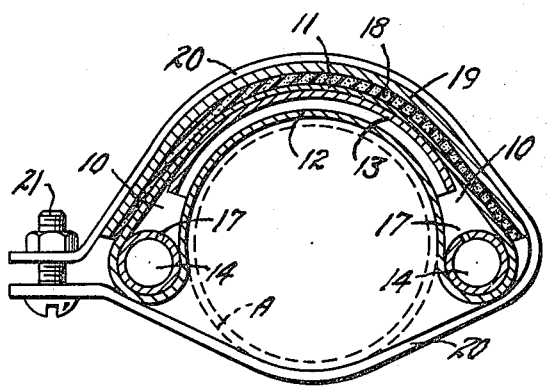
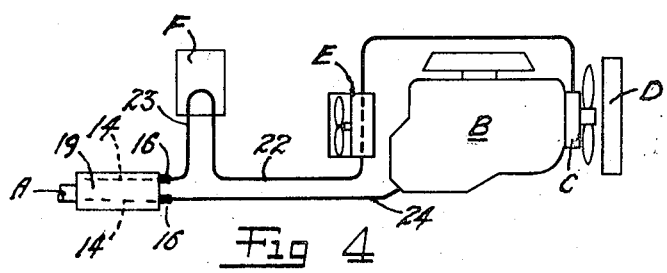

3,698,992
WATER HEATING ATTACHMENTS FOR AUTOMOTIVE ENGINE EXHAUST PIPES
Walter R. Armand, 1320 Speer Blvd.,
Denver, Colo. 80204
Filed Feb. 17, 1971, Ser. No. 115,959
Int. Cl. F28d 7/10
U.S. Cl. 165—51                                             2 Claims

ABSTRACT OF THE DISCLOSURE

An elongated water jacket of inverted U-shaped cross section adapted to be externally fitted over and clamped against one side of the exhaust pipe of the engine of an automotive vehicle so as to partially enclose the pipe. The jacket being provided with two internal perforated water distributing pipes terminating in nipples which enable the jacket to be connected in series between the water jacket of the vehicle engine and a passenger-heater in the vehicle for supplying hot water heat to the passenger-heater.

---

Conventional automotive passenger-heaters usually comprise tubular radiators positioned below the instrument boards of the vehicle through which hot water from the cooling systems of the vehicle engines is circulated and against which air is impelled by an electric fan to supply heat to the passengers. Such heaters are reasonably satisfactory for small average passenger cars but have presented a problem for uniformly heating multi-passenger vehicles such as urban and interurban street buses, school buses and the like.

Attempts have been made to accommodate the additional passengers by increasing the capacity of the conventional heater but such attempts result in overheating the near passengers and underheating the far passengers. Other attempts have been made to provide a plurality of the present heaters at spaced locations throughout the passenger area. These attempts not only required an impractical multitude of water pipes, hoses and wires to convey the water to the many individual heaters from the engine cooling system, and often resulted in so reducing the water temperature that the heater radiators could not supply sufficient heat in inclement weather. A further disadvantage of the multiple individual heater attempt is the excessive electrical load that is placed on the vehicle battery by the plurality of electric fans required.

The principal object of this invention is to provide an additional heat source for passenger heaters comprising a water heater attachment which can be quickly and easily attached to the exhaust pipe of the vehicle engine without change in, or removal of, the pipe and which can be readily connected in series with the radiator of a present conventional passenger heater to provide heat for additional passenger heaters without disturbance of the present passenger heating system.

Other objects and advantages reside in the detail construction of the invention, which is designed for simplicity, economy and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a top plan view of the water heating attachment of this invention as it would appear in place upon a conventional automotive exhaust pipe;

FIG. 2 is an enlarged side elevational view thereof, partly in longitudinal section, the sectional portion thereof being taken on the line 2—2, FIG. 1;

FIG. 3 is a similarly enlarged cross section thereof, taken on the line 3—3, FIG. 2; and FIG. 4 is a schematic flow diagram showing how the improved auxiliary water heating attachment can be combined with a conventional passenger heating system to add additional heating units thereto.

In FIGS. 1 and 2, a conventional engine exhaust pipe is indicated in broken line at A and in FIG. 4 a water-jacketed engine block is indicated at B with its water pump at C and its radiator at D. A present passenger heater is indicated at E and an additional passenger heater is indicated at F.

The auxiliary heat source of this invention comprises a hollow elongated water jacket 10 of inverted-U-shaped cross section having an upper arcuate wall 11 and a lower arcuate wall 12 radially spaced from each other. The cross sectional radius of the lower wall 12 is such as to snugly contact the upper 180° of the exhaust pipe A. The longitudinal medial portions of the two walls 11 and 12 are maintained in closely spaced concentric relation by means of an arcuate, transversally-corrugated spacing sheet 13 which may be soldered or otherwise secured to both walls.

The walls 11 and 12 are integrally formed or longitudinally joined along their lower edges beneath two parallel spaced apart longitudinally extending, water-distributing pipes 14 as shown in FIG. 3. The longitudinal extremities of the walls 11 and 12 are sealed together in any desired manner such as by soldering them to inverted U-shaped end plates 15 so as to form the sealed U-shaped water jacket 10 in which the distributing pipes 14 and the corrugated spacing sheet 13 are contained.

The inner extremity of each distributing pipe 14 is permanently closed in any desired manner such as by soldering or sealing it to one of the end plates 15. The other extremities of the two distributing pipes protrude through the other end plate 15 and are preferably circumferentially grooved to form protruding hose-receiving nipples 16 on the pipes. Each distributing pipe is provided with an aligned plurality of spaced jet perforations 17 positioned to direct water jets toward or receive water from the side edges of, and transversally of, the arcuate corrugated spacer sheet 13 to produce a transverse flow of water over the top of the lower arcuate wall 12 within the water jacket 10.

The convex top of the upper wall 11 is completely covered by a layer of asbestos insulation 18 which is maintained in intimate contact with the wall 11 by means of an arcuate top plate 19 which is adhesively or otherwise secured over the insulated layer 18 in any suitable manner to protect the insulation and the water jacket 10 from mechanical injury.

For use, the above described auxiliary heater assembly is simply positioned saddle-like over the exhaust pipe A and tightly clamped against and along the upper side of the exhaust pipe by means of clamp straps 20. The clamp straps encircle both the heater and the exhaust pipe and are provided with clamp bolts 21 which tightly clamp the lower arcuate wall 12 of the jacket 10, throughout its length and width, into tight intimate contact with the exhaust pipe A.

Referring to FIG. 4, it can be seen that if it be desired to supply heat to the additional passenger heater F: a first hose 22 will be extended from the present heater E to the additional heater F; a second hose 23 will be extended from the additional heater to one of the distributing pipes 14; a third hose 24 will be extended from the other distributing pipe 14 to the water jacket of the engine block B. Thus, the water will be pumped by the pump C in a series circuit through the two heaters E and F and will be supplied with heat from both the engine block B and from the exhaust pipe A.

If still additional heaters are desired, additional similar water heating attachments may be attached along the exhaust pipe and additional individual passenger heaters may be installed in the vehicle and connected in the said series circuit so that all will be simultaneously energized from a single hydraulic circuit actuated by the motor pump C.

The additional heaters need be only simple conventional tubular heat exchangers or radiators without the electric fans of the present heaters. Additional efficiency is obtained by forming the walls of the water jacket 10 of a relatively soft metal of high heat transference such as copper so that it will conform to irregularities in the exhaust pipe when clamped thereon to obtain highly efficient thermal interchange. The top plate 19 should be of stiffer non-corrosive metal such as aluminum or stainless steel for mechanical rigidity.

The auxiliary water heating attachment can be of any desired length and additional clamp straps can be placed thereabout if required or desired for additional mechanical rigidity.

While a selected form of the invention has been above described, it is understood that mechanical variations and detail substitutions can be made by one skilled in the art without departing from the spirit of the invention.

Having thus described the invention, what is claimed and desired to be secured by Letters Patent is:

1. Means for heating water from an exhaust pipe of a water jacketed engine in an automotive vehicle comprising:
   (a) a hollow elongated transversely arcuate water jacket of substantially U-shaped cross section extending longitudinally of and in partial circumferential relation with said exhaust pipe for a portion of the length of said pipe;
   (b) said jacket including an inner wall in contact with approximately one half of the circumference of said exhaust pipe;
   (c) said jacket further including a semi-cylindrical outer wall spaced from and peripherally connected to said inner wall defining a water passage between said walls;
   (d) an inlet hose nipple connected to said water passage;
   (e) an outlet hose nipple connected to said water passage;
   (f) a pair of water distributing pipes one of said pair extending longitudinally along each side of said arcuate jacket and connected to said inlet and outlet nipples respectively;
   (g) an arcuate corrugated spacer sheet positioned within said water jacket with said corrugations contacting the walls of said jacket to define arcuate circumferential channels in said jacket between said pipes;
   (h) spaced perforations along each of said distributing pipes directed toward said channels defined by said corrugated spacer sheet; and
   (i) clamping means encircling said water jacket and said exhaust pipe securing said water jacket in heat transference relation with said exhaust pipe.

2. Means for heating water as described in claim 1 in which the clamping means comprises:
   tension means circumferentially surrounding both the arcuate water jacket and the exhaust pipe and acting to draw the exhaust pipe into the bight of said water jacket.

References Cited

UNITED STATES PATENTS

| 1,098,416 | 6/1914 | Carpenter | 237—12.3 B |
| 1,514,105 | 7/1912 | Thomas | 237—12.3 B |

CHARLES SUKALO, Primary Examiner

U.S. Cl. X.R.

161—51